US012626998B2

(12) United States Patent
Wang et al.

(10) Patent No.: US 12,626,998 B2
(45) Date of Patent: May 12, 2026

(54) END COVER ASSEMBLY, BATTERY, AND ELECTRIC DEVICE

(71) Applicant: CONTEMPORARY AMPEREX TECHNOLOGY CO., LIMITED, Ningde (CN)

(72) Inventors: Liqin Wang, Ningde (CN); Quankun Li, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 15 days.

(21) Appl. No.: 18/808,093

(22) Filed: Aug. 19, 2024

(65) Prior Publication Data

US 2024/0413483 A1    Dec. 12, 2024

Related U.S. Application Data

(63) Continuation of application No. PCT/CN2022/088766, filed on Apr. 24, 2022.

(51) Int. Cl.
    *H01M 50/148*        (2021.01)
    *B60L 50/64*         (2019.01)
    *H01M 10/04*         (2006.01)
    *H01M 50/15*         (2021.01)
    *H01M 50/30*         (2021.01)

(52) U.S. Cl.
    CPC .......... *H01M 50/394* (2021.01); *B60L 50/64* (2019.02); *H01M 50/15* (2021.01); *H01M 2220/20* (2013.01)

(58) Field of Classification Search
    CPC ........................... H01M 50/394; H01M 50/15
    See application file for complete search history.

(56) References Cited

U.S. PATENT DOCUMENTS

2021/0148478 A1    5/2021    Yue et al.

FOREIGN PATENT DOCUMENTS

| CN | 208507798 U | 2/2019 |
| CN | 210136896 U | 3/2020 |
| CN | 111834580 A | 10/2020 |
| CN | 212584354 U | 2/2021 |
| CN | 212810474 U | 3/2021 |
| CN | 112787007 A | 5/2021 |

(Continued)

OTHER PUBLICATIONS

Machine translation of JP 2015170468A from espacenet (Year: 2015).*

(Continued)

*Primary Examiner* — Maria Laios
*Assistant Examiner* — Zackary Richard Cochenour
(74) *Attorney, Agent, or Firm* — K&L Gates LLP

(57) ABSTRACT

An end cover assembly, a battery, and an electric device are provided. The end cover assembly is applied to a battery and includes an end cover, a breather valve, and a protective patch. The end cover has a first side facing inside of the battery and a second side opposite the first side and includes a first channel in communication with the first side and the second side. The breather valve includes a gas-permeable membrane in gas communication with the first channel. The gas-permeable membrane includes a gas-permeable portion opened towards the second side of the end cover. The protective patch is provided on the second side of the end cover and covers the gas-permeable portion. The battery includes the end cover assembly. The electric device includes the battery.

13 Claims, 14 Drawing Sheets

(56)                References Cited

FOREIGN PATENT DOCUMENTS

| | | | |
|---|---|---|---|
| CN | 215933763 | U | 3/2022 |
| EP | 3772120 | A1 | 2/2021 |
| EP | 3923405 | A1 | 12/2021 |
| JP | 2010176870 | A | 8/2010 |
| JP | 2015170468 | A | 9/2015 |
| JP | 2017220656 | A | 12/2017 |
| JP | 2021093355 | A | 6/2021 |
| KR | 20210060361 | A | 5/2021 |
| WO | 2022003716 | A1 | 1/2022 |

OTHER PUBLICATIONS

The Request for the Submission of an Opinion received in the counterpart KR Application No. 10-2024-7007726, mailed on Oct. 28, 2025, 14 pages with English translation.

International Search Report received in the corresponding international application PCT/CN2022/088766, mailed on Dec. 15, 2022.
Written Opinion of ISA received in the corresponding international application PCT/CN2022/088766, mailed on Dec. 15, 2022.
The Notice of Reasons for Refusal received in the counterpart JP Application No. 2024-517090, mailed on Apr. 16, 2025, 10 pages with English translation.
The extended European search report received in the counterpart European application 22938805.3, mailed on Sep. 25, 2024.
Notice of Allowance (with English Machine Translation), mailed Jul. 24, 2025, for corresponding Japanese Patent Application Serial No. 2024-517090.
Office Action, mailed Feb. 27, 2026, for corresponding European Patent Application Serial No. 22938805.3.
Office Action (with English Machine Translation), mailed Mar. 25, 2026, for corresponding Chinese Patent Application Serial No. 202280038115.2.

* cited by examiner

217

2171

2172

217

2172

2171

END COVER ASSEMBLY, BATTERY, AND ELECTRIC DEVICE

CROSS-REFERENCE TO RELATED APPLICATIONS

This application is a continuation application of PCT Patent Application No. PCT/CN2022/088766, entitled "END COVER ASSEMBLY, BATTERY, AND ELECTRIC DEVICE" filed on Apr. 24, 2022, the content of which is incorporated herein by reference in its entirety.

TECHNICAL FIELD

This disclosure relates to the field of battery technologies, and in particular, to an end cover assembly, a battery, and an electric device.

BACKGROUND

In the related art, a breather valve can be provided on an end cover assembly of a battery cell to balance internal and external pressure of the battery cell so as to protect internal components. Under the action of a pressure difference, gas inside and outside the battery cell passes through a gas-permeable membrane via a gas channel of the breather valve for gas compensation to maintain internal and external gas pressure balance for the battery cell.

In the process of implementing this disclosure, the inventor has found that: in an assembly process of the battery cell, foreign substances such as welding slag produced in a welding process and spray liquid produced in an electrolyte injection process contaminate the breather valve, thus affecting the gas permeation effect.

SUMMARY

This disclosure provides an end cover assembly, a battery, and an electric device to protect a breather valve and improve the gas permeation effect of the breather valve.

According to a first aspect, this disclosure provides an end cover assembly. The end cover assembly is applied to a battery and includes an end cover, a breather valve, and a protective patch. The end cover has a first side facing inside of the battery and a second side opposite the first side and includes a first channel in communication with the first side and the second side. The breather valve includes a gas-permeable membrane in gas communication with the first channel. The gas-permeable membrane includes a gas-permeable portion opened towards the second side of the end cover. The protective patch is provided on the second side of the end cover and covers the gas-permeable portion.

According to the end cover assembly of this disclosure, due to the provision of the protective patch, the protective patch covers the gas-permeable portion of the gas-permeable membrane facing the second side of the end cover, helping to prevent welding slag or an electrolyte from polluting the gas-permeable membrane. Therefore, the gas-permeable membrane of the breather valve in the end cover assembly can be protected by the protective patch, the gas permeation effect of the breather valve is improved, and thus the breather valve can better balance internal and external pressure of a battery cell to achieve the function of protecting internal components.

In an end cover assembly according to some embodiments, a second channel in gas communication with the gas-permeable membrane is provided between the protective patch and the end cover.

Since the second channel in gas communication with the gas-permeable membrane is provided between the protective patch and the end cover, the second channel enables gas passing through the gas-permeable membrane of the breather valve to smoothly enter or get out of the battery cell.

In an end cover assembly according to some embodiments, the end cover includes a breather valve mounting groove; the breather valve is located in the breather valve mounting groove; the first channel is provided in a bottom wall of the breather valve mounting groove, and the second channel is in communication with the breather valve mounting groove; where an opening of the breather valve mounting groove is provided in the first side of the end cover or the opening of the breather valve mounting groove is provided in the second side of the end cover.

The gas-permeable membrane is mounted on the valve plate, facilitating protection and support for the gas-permeable membrane and reducing adverse impact caused by provision of the first channel on the end cover. The valve plate and gas-permeable membrane of the breather valve are provided in the breather valve mounting groove, so that on the premise of not affecting gas permeation of the breather valve, the breather valve is mounted without occupying the thickness of the end cover to the greatest extent, helping to reduce an overall height of the end cover assembly and the battery.

In an end cover assembly according to some embodiments, the breather valve further includes a valve plate. The valve plate is mounted on the end cover and includes a third channel running through two side surfaces of the valve plate. The gas-permeable membrane is fixed to the valve plate and covers the third channel. The breather valve mounting groove is a stepped groove, and the stepped groove includes a first groove section and a second groove section. The first groove section is close to the bottom wall of the breather valve mounting groove, the gas-permeable membrane is located in the first groove section and has a gap with the bottom wall. The second groove section is connected to the first groove section, with a step surface formed at a joint. The valve plate is located in the second groove section and abuts against the step surface.

The above arrangement helps the gas-permeable membrane to keep fluid communication with the first channel and the third channel and helps the gas-permeable membrane to stably balance the internal and external pressure of the battery cell.

In an end cover assembly according to some embodiments, a height of the first groove section is 0.1 mm to 0.5 mm greater than a thickness of the gas-permeable membrane; and/or a height of the second groove section is equal to a thickness of the valve plate or is no more than 0.5 mm greater than the thickness of the valve plate.

A reasonable relationship between the height of the first groove section and the thickness of the gas-permeable membrane helps to maintain unblocking between the gas-permeable membrane and the first channel. A reasonable relationship between the height of the second groove section and the thickness of the valve plate helps to reduce an additional space other than the thickness of the valve plate occupied by the breather valve and also helps to reduce adverse impact on the valve plate caused by processing the breather valve mounting groove.

In an end cover assembly according to some embodiments, the end cover includes an end cover body, and the breather valve mounting groove is provided in the end cover body, where the end cover further includes a lug boss provided on the end cover body and protruding towards the second side of the end cover, the second channel including a communication groove or communication hole provided in the lug boss; and/or a ventilation groove, where the ventilation groove is provided in the end cover body, located on the second side of the end cover and in communication with the breather valve mounting groove, and the second channel includes the ventilation groove.

The lug boss is provided, and the communication groove or communication hole is provided in the lug boss as at least a portion of the second channel, or the ventilation groove is provided as at least a portion of the second channel, facilitating formation of the second channel by virtue of a simple structure and processing method and preventing the gas permeation function of the gas-permeable membrane from being affected by the protective patch.

In an end cover assembly according to some embodiments, the lug boss has a height of 0.1 mm to 0.5 mm; and/or the lug boss is located on an outer side of the breather valve mounting groove, and a distance from an edge of the lug boss close to the breather valve mounting groove to an edge of the breather valve mounting groove is 0.5 mm to 3 mm.

A reasonable height of the lug boss helps to maintain smooth flowing of gas flow inside and outside the battery cell through the breather valve while reducing the height occupied by the breather valve to the greatest extent. Reasonable relative positions of the lug boss and the breather valve mounting groove facilitate assembly and convenient operation during maintenance of the breather valve. For example, an operation space is left for laser welding during mounting of the valve plate.

In an end cover assembly according to some embodiments, the ventilation groove has a depth of 0.05 mm to 0.3 mm; and/or a distance from an edge of the ventilation groove located on an outer side of the protective patch to an edge of the protective patch is 0.1 mm to 0.5 mm.

A reasonable depth of the ventilation groove and a reasonable distance from the ventilation groove to the protective patch help to maintain smooth flowing of the gas flow inside and outside the battery cell through the breather valve.

In an end cover assembly according to some embodiments, the protective patch includes a patch body covering the gas-permeable portion and a fixing adhesive layer, where the fixing adhesive layer is provided on a side of the patch body facing the end cover, and the patch body is adhered to the second side of the end cover by virtue of the fixing adhesive layer.

The protective patch includes the patch body and the fixing adhesive layer, and the patch body is fixedly connected by virtue of the fixing adhesive layer, facilitating quick and secure mounting of the protective patch.

In an end cover assembly according to some embodiments, the fixing adhesive layer is attached to a partial region of the patch body, where a region, with no fixing adhesive layer attached, of the patch body is transparent; and/or the region, with the fixing adhesive layer attached, of the patch body and/or the fixing adhesive layer is colored.

The region, with no fixing adhesive layer attached, of the patch body is transparent, helping to observe whether there is a foreign substance on surface of the second side of the breather valve facing the end cover assembly, thereby discovering problems of the breather valve in a timely manner. The region, with the fixing adhesive layer attached, of the patch body and/or the fixing adhesive layer is colored, helping to quickly identify whether the protective patch is provided on the end cover assembly, thereby preventing the gas-permeable membrane from being unprotected due to absence of the patch.

In an end cover assembly according to some embodiments, the fixing adhesive layer is located at an edge of the patch body; and/or the fixing adhesive layer is kept away from the second channel.

The fixing adhesive layer is located at the edge of the patch body, such that the amount of a fixing adhesive used can be reduced without affecting an adhesion effect. The fixing adhesive layer being kept away from the second channel helps to prevent dust adhesion and accumulation at a position where the second channel is located, thereby helping to maintain the second channel unblocked.

In an end cover assembly according to some embodiments, the protective patch includes a patch body covering the gas-permeable portion; the patch body is made of polyethylene glycol terephthalate; and/or the patch body has a thickness of 0.1 mm to 0.2 mm.

The patch body is made of polyethylene glycol terephthalate and/or the patch body is provided with an appropriate thickness, such that foreign substances such as electrolyte, moisture, and dust can be effectively shielded.

In an end cover assembly according to some embodiments, the end cover includes a patch mounting groove, and the protective patch is located in the patch mounting groove.

The protective patch is mounted in the patch mounting groove on the end cover 211, facilitating accurate positioning and quick assembly of the protective patch and helping to prevent the protective patch from falling off.

According to a second aspect, this disclosure provides a battery, where the battery includes the end cover assembly according to the first aspect of this disclosure. The battery of this disclosure has the same advantages as the end cover assembly of this disclosure.

According to a third aspect, this disclosure provides an electric device, where the electric device includes the battery according to the second aspect of this disclosure, and the battery is configured to provide electric power for the electric device. The electric device of this disclosure has the same advantages as the end cover assembly and battery of this disclosure.

BRIEF DESCRIPTION OF DRAWINGS

To describe the technical solutions in the embodiments of this disclosure more clearly, the following briefly describes the accompanying drawings required for describing the embodiments of this disclosure. Apparently, the accompanying drawings in the following description show merely some embodiments of this disclosure, and persons of ordinary skill in the art may still derive other drawings from the accompanying drawings without creative efforts.

Figure 1:
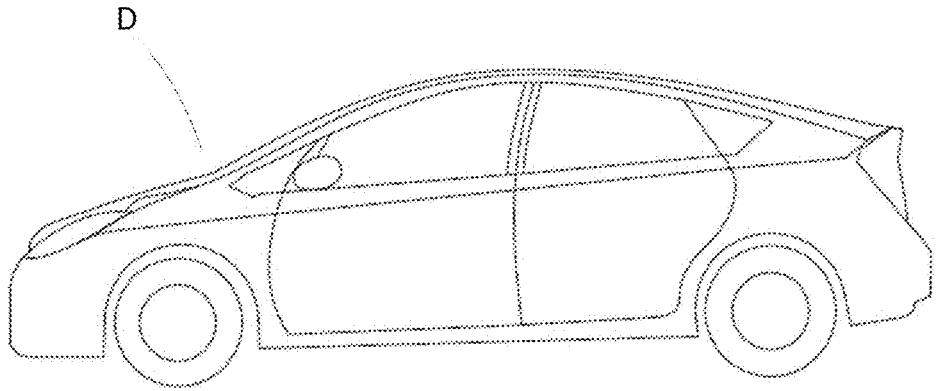
FIG. 1 is a schematic structural diagram of a vehicle serving as an electric device according to an embodiment of this disclosure.

The accompanying drawings are not drawn to scale.

DESCRIPTION OF EMBODIMENTS

The following further describes the embodiments of this disclosure in detail with reference to the accompanying drawings and examples. The detailed description and accompanying drawings of the following embodiments are used to exemplarily illustrate the principle of this disclosure rather than to limit the scope of this disclosure, that is, this disclosure is not limited to the described embodiments.

In the descriptions of this disclosure, it should be noted that, unless otherwise stated, "a plurality of" means two or more; and the orientations or positional relationships indicated by the terms "upper", "lower", "left", "right", "inside", "outside", and the like are merely for ease and brevity of description of this disclosure rather than indicating or implying that the means or components mentioned must have specific orientations or must be constructed or manipulated according to particular orientations. These terms shall therefore not be construed as limitations on this application. In addition, the terms "first", "second", "third", and the like are merely for the purpose of description and shall not be understood as any indication or implication of relative importance. "Perpendicular" is not perpendicular in the strict sense but within an allowable range of error. "Parallel" is not parallel in the strict sense but within an allowable range of error.

The words of orientation appearing in the following description are all directions shown in the drawings, and do not limit the specific structure of this disclosure. In the descriptions of this disclosure, it should also be noted that unless otherwise specified and defined explicitly, the terms "mount", "connect", and "join" should be understood in their general senses. For example, they may refer to a fixed connection, a detachable connection, or an integral connection, and may refer to a direct connection or an indirect connection via an intermediate medium. Persons of ordinary skill in the art can understand specific meanings of the foregoing terms in this disclosure as appropriate to specific situations.

To solve the technical problems that foreign substances such as welding slag produced in a welding process and spray liquid produced during electrolyte injection in a battery and a battery cell contaminate the breather valve and affect the gas permeation effect, an embodiment of this disclosure provides an end cover assembly for effectively protecting the breather valve. Further, an embodiment of this disclosure further provides a battery including such end cover assembly and an electric device including such battery.

An embodiment of this disclosure provides an electric device using a battery as a power supply, where the battery is configured to provide electric power for the electric device. The electric device may be but is not limited to a mobile phone, a portable device, a notebook computer, an electric bicycle, an electric vehicle, a ship, a spacecraft, an electric toy, and an electric tool. For example, the spacecraft includes an airplane, a rocket, a space shuttle, and a spaceship. The electric toy includes a fixed or mobile electric toy, such as a game console, an electric vehicle toy, an electric ship toy, and an electric airplane toy. The electric tool includes an electric metal cutting tool, an electric grinding tool, an electric assembly tool, and an electric railway-specific tool, such as an electric drill, an electric grinder, an electric wrench, an electric screwdriver, an electric hammer, an electric impact drill, a concrete vibrator, and an electric planer.

The battery according to the embodiments of this disclosure refers to a single physical module that includes one or more battery cells for providing a higher voltage and capacity. The battery may include three forms: battery cell, battery module, and battery pack.

The battery cell refers to a smallest unit that constitutes the battery module or the battery pack. A plurality of battery cells can be connected in series and/or in parallel through electrode terminals for various application scenarios, for example, some high-power application scenarios such as electric vehicles.

The battery module is formed by electrically connecting a specific quantity of battery cells and putting the battery cells into a frame to protect the battery cells from external impact, heat, vibration, and the like. With the development of technologies, the battery module may be omitted, that is, the battery pack is directly formed using battery cells.

The battery pack is a final state of a battery system assembled in a high-power electric device such as an electric vehicle. Generally, a battery pack includes a box configured to package one or more battery cells. The box can prevent liquids or other foreign substances from affecting charging or discharging of the battery cell. The box is generally formed by a box housing and a box cover. Most existing battery packs are formed by assembling various control and protection systems such as a battery management system (Battery Management System, MBS) and a thermal management component on one or more battery modules. With this improvement, weight energy density and volumetric energy density of the battery system are improved, and the number of parts is remarkably reduced.

For ease of description, a vehicle D serving as an electric device according to some embodiments of this disclosure is used as an example for description below.

Figure 2:
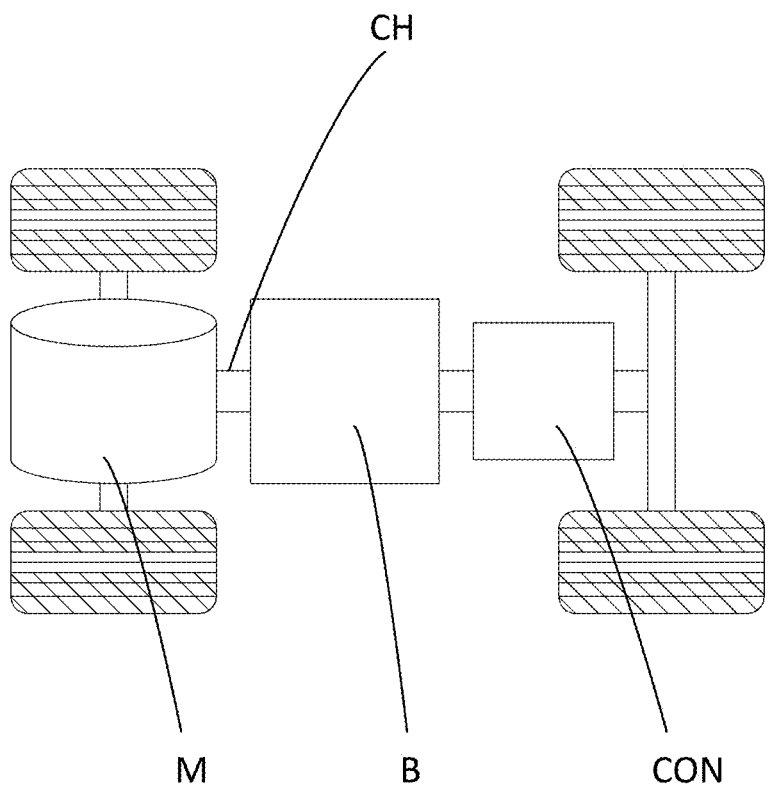
FIG. 2 is a schematic structural diagram of a bottom of a vehicle serving as an electric device according to an embodiment of this disclosure.

Refer to FIG. 1 and FIG. 2. FIG. 1 is a schematic structural diagram of a vehicle D according to some embodiments of this disclosure. The vehicle D may be a fossil fuel vehicle, a natural-gas vehicle, or a new energy vehicle, where the new energy vehicle may be a battery electric vehicle, a hybrid electric vehicle, a range-extended vehicle, or the like. The vehicle D is provided with a battery B inside, where the battery B may be disposed at the bottom, front, or rear of the vehicle D. The battery B may be configured to provide power for the vehicle D. For example, the battery may be used as an operational power source for the vehicle D.

FIG. 2 illustrates a bottom structure of the vehicle shown in FIG. 1. The battery B may be disposed at a chassis CH of the vehicle D. The vehicle D may further include a controller CON and a motor M. The battery B is configured to provide electric power for operation of the motor M and other components in the vehicle D. The controller CON is configured to control operation of the motor M, for example, to satisfy power needs of start, navigation, and running of the vehicle D.

In some embodiments of this disclosure, the battery B can be used as not only the operational power source for the vehicle D but also a driving power source for the vehicle D, replacing or partially replacing fossil fuel or natural gas to provide driving traction for the vehicle D.

Figure 3:
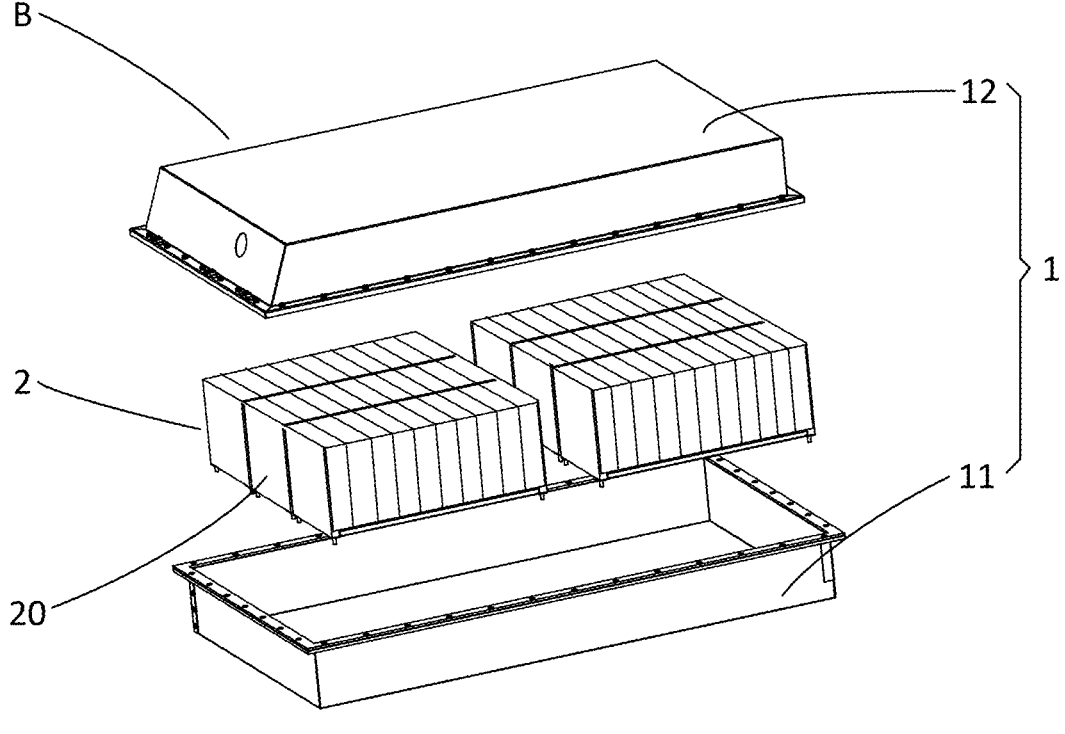
FIG. 3 is a schematic structural diagram of a battery according to an embodiment of this disclosure.

Referring to FIG. 3, FIG. 3 is an exploded view of a battery B according to some embodiments of this disclosure.

The battery B includes a box 1 and a battery cell 20 accommodated in the box 1. The box 1 includes a box housing 11 and a box cover 12 fitting with the box housing 11, and the box 1 is configured to provide an accommodating space for the battery cell 20. In the above embodiments, the overall box 1 is a cuboid. In the unillustrated embodiments, the box 1 may be in another shape, for example, in a cylinder shape.

In the battery B, the battery cells 20 are present in plurality, and the plurality of battery cells 20 may be connected in series, parallel, or series-parallel. Being connected in series-parallel means a combination of series and parallel connections of the plurality of battery cells 20. The plurality of battery cells 20 may be directly connected in series, parallel, or series-parallel, and then an entirety of the plurality of battery cells 20 is accommodated in the box 1.

As shown in FIG. 3, the battery B may be formed in a manner that a plurality of battery cells 20 are first connected in series, parallel, or series-parallel to form a battery pack 2. The battery pack 2 can be formed in a form of a battery module. A plurality of battery packs 2 are then connected in series, parallel, or series-parallel to form an entirety which is accommodated in the box 1. The battery B may further include other structures. For example, the battery B may further include a busbar configured to implement electrical connection between the plurality of battery cells 20.

The battery cell may include a lithium-ion battery, a lithium-sulfur battery, a sodium lithium-ion battery, a sodium-ion battery, a magnesium-ion battery, or the like, or may be a primary battery or a second battery. This is not limited in the embodiments of this disclosure. The battery cell may be cylindrical, flat, rectangular, or of another shape. This is also not limited in the embodiments of this disclosure. Battery cells are typically classified into three types by packaging method: cylindrical battery cells, prismatic battery cells, and pouch battery cells. This is also not limited in the embodiments of this disclosure.

The battery cell mainly includes an electrode assembly, a housing, and an end cover assembly. The electrode assembly is packaged in the housing through an end cover of the end cover assembly. The number of the electrode assembly is, for example, 1, 2, or more.

The electrode assembly is disposed in the housing. The electrode assembly is a component in which electrochemical reactions take place in the battery cell. The electrode assembly may be a wound structure or a stacked structure. However, the embodiments of this disclosure are not limited thereto.

The housing refers to a component configured to provide an accommodating space for accommodating the electrode assembly, an electrolyte, and other components therein. The housing may be of various shapes and sizes, such as a rectangular shape, a cylindrical shape, and a hexagonal prism shape. Specifically, the shape of the housing may be determined based on a specific shape and size of the electrode assembly. The housing may be made of a material such as copper, iron, aluminum, stainless steel, aluminum alloy, or plastic.

The end cover refers to a component that covers an opening of the housing to insulate internal environment of the battery cell from external environment. The shape of the end cover may fit with that of the housing, so that the end cover can match the housing. Optionally, the end cover may be made of a material with given hardness and strength (for example, aluminum alloy), so that the end cover is less likely to deform when subjected to extrusion and collision, enabling the battery cell to have higher structural strength and enhanced safety performance. The end cover may be provided with functional components such as an electrode terminal. The electrode terminal may be configured to be electrically connected to the electrode assembly for outputting or inputting electrical energy of the battery cell. In some embodiments, the end cover may also be provided with a pressure relief mechanism configured to relieve internal pressure when the internal pressure or temperature in the battery cell reaches a threshold. The end cover may also be made of various materials such as copper, iron, aluminum, stainless steel, aluminum alloy, and plastic, which are not limited in the embodiments of this disclosure.

The housing and the end cover may be independent components, and an opening is provided in the housing, so that the end cover can close the opening to form the internal environment of the battery cell. Without limitation, the end cover and the housing may also be integrated. Specifically, the end cover and the housing may form a shared connection surface before other components are disposed inside the housing, then the end cover covers the housing when inside of the housing needs to be enclosed, and the housing and the end cover are packaged integrally.

The end cover assembly may include a pressure relief mechanism. The pressure relief mechanism refers to an element or component that is actuated when internal pressure or temperature in the battery cell reaches a predetermined threshold, so as to release the internal pressure or temperature. The pressure relief mechanism is, for example, an explosion-proof valve. The explosion-proof valve is generally disposed on the end cover of the battery cell. The explosion valve may be, for example, a part of a flat plate surface of the end cover or may be welded to the flat plate surface of the end cover.

The end cover assembly may further include a breather valve. The breather valve has waterproof, gas-permeable, oil-proof and dust-proof functions and can balance internal and external pressure of a battery box while playing a protection role, so as to protect internal components. The breather valve is a mountable and detachable protective component formed by combining a gas-permeable membrane with a valve body using processes such as injection molding, welding, bonding, and hot melting. Under the action of a pressure difference, gas inside and outside the housing of the battery cell passes through the gas-permeable membrane via a gas channel of the breather valve for gas compensation to maintain internal and external gas pressure balance for the battery box. The gas-permeable membrane is a key constituent portion of the breather valve. The gas-permeable membrane may be made of, for example, expanded polytetrafluoroethy (expanded polytetrafluoroethy, E-PTFE). Breather valves can be classified into an injection-molded type, a welded type, an interference-fit type, and a bonded type according to connection manners between the gas-permeable membrane and the valve body, can be classified into a one-direction type and a bidirectional type according to gas flowing directions, and are mainly classified into a thread type, a pressed-in type, a buckle type, a button type, and the like, which are not limited in the embodiments of this disclosure.

In a battery cell according to some embodiments, an insulator may also be disposed at an inner side of the end cover. The insulator can be configured to insulate electrical connection parts in the housing from the end cover, reducing a risk of short circuit. For example, the insulator may be an insulating plate, and may be made of materials such as plastic and rubber.

Figure 4:
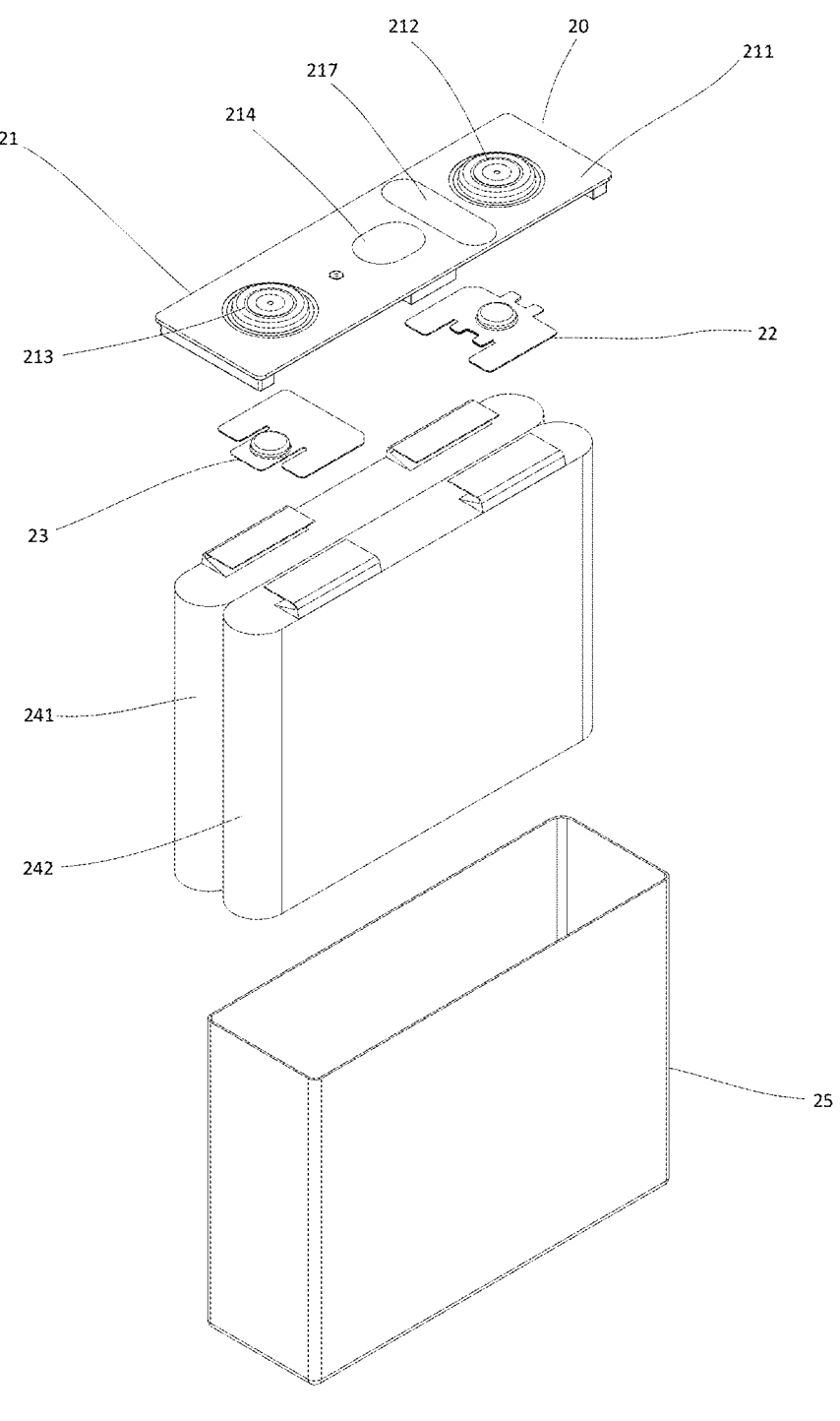
FIG. 4 is a schematic structural exploded view of a battery cell in a battery according to an embodiment of this disclosure.

As shown in FIG. 4, in some embodiments of this disclosure, the battery cell 20 includes an end cover assembly 21, a housing 25, a first electrode assembly 241, a second electrode assembly 242, a first connecting plate 22, and a first connecting plate 23. The first connecting plate 22 connects positive electrode tabs of the first electrode assembly 241 and second electrode assembly 242 and a first electrode terminal 212 on an end cover 211 of the end cover assembly 21. The first connecting plate 23 connects negative electrode tabs of the first electrode assembly 241 and second electrode assembly 242 and a second electrode terminal 213 on the end cover 211 of the end cover assembly 21.

As shown in FIG. 4, the end cover assembly 21 includes the end cover 211, the first electrode terminal 212, the second electrode terminal 213, an explosion-proof valve 214, a breather valve 215, and an insulating plate 216. The end cover 211 is configured to fit with the housing 25 so as to package the first electrode assembly 241 and the second electrode assembly 242 in a closed space formed by the end cover 211 and the housing 25. The first electrode terminal 212 is a positive electrode terminal and is electrically connected to the positive electrode tabs of the first electrode assembly 241 and second electrode assembly 242 by virtue of the first connecting plate 22. The second electrode terminal 213 is a negative electrode terminal and is electrically connected to the negative electrode tabs of the first electrode assembly 241 and second electrode assembly 242 by virtue of the first connecting plate 23. The insulating plate 216 is disposed between the end cover 211 and the first connecting plate 22 as well as the first connecting plate 23 to insulate the end cover 211 from the first connecting plate 22 and the first connecting plate 23 as well as from the first electrode assembly 241 and the second electrode assembly 242.

As shown in FIG. 5 to FIG. 29, the end cover assembly 21 according to an embodiment of this disclosure is applied to a battery and includes an end cover 211 and a breather valve 215 mounted on the end cover 211. The end cover 211 has a first side facing inside of the battery and a second side opposite the first side and includes a first channel 2113 in communication with the first side and the second side. The breather valve 215 includes a gas-permeable membrane 2152 in gas communication with the first channel 2113. The gas-permeable membrane 2152 includes a gas-permeable portion 2152A opened towards the second side of the end cover 211. The breather valve 215 further includes a protective patch 217. The protective patch 217 is provided on the second side of the end cover 211 and covers the gas-permeable portion 2152A.

In the end cover assembly 21 of this embodiment of this disclosure, the protective patch 217 is provided, so that the protective patch 217 covers the gas-permeable portion 2152A of the gas-permeable membrane 2152 opened towards the second side of the end cover 211, helping to prevent welding slag or an electrolyte from polluting the gas-permeable membrane 2152. Therefore, the gas-permeable membrane 2152 of the breather valve 215 in the end cover assembly 21 can be protected by the protective patch 217, the gas permeation effect of the breather valve 215 is improved, and thus the breather valve can better balance internal and external pressure of a battery cell to achieve the function of protecting internal components.

As shown in FIG. 5 to FIG. 10, FIG. 13 to FIG. 22, and FIG. 25 to FIG. 29, in an end cover assembly according to some embodiments, a second channel in gas communication with the gas-permeable membrane 2152 is provided between the protective patch 217 and the end cover 211.

Since the second channel in gas communication with the gas-permeable membrane 2152 is provided between the protective patch 217 and the end cover 211, the second channel enables gas passing through the gas-permeable membrane 217 of the breather valve 215 to smoothly enter or get out of the battery cell 20.

As shown in FIG. 6 to FIG. 10, FIG. 14 to FIG. 18, FIG. 20, FIG. 22, FIG. 26, and FIG. 28, in an end cover assembly 21 according to some embodiments, the end cover 211 includes a breather valve mounting groove 2112; the breather valve is located in the breather valve mounting groove 2112; the first channel 2113 is provided in a bottom wall of the breather valve mounting groove 2112, and the second channel is in communication with the breather valve mounting groove 2112; where an opening of the breather valve mounting groove 2112 is provided in the first side of the end cover 211 or the opening of the breather valve mounting groove 2112 is provided in the second side of the end cover 211.

The gas-permeable membrane 2152 is mounted on the valve plate 2151, facilitating protection and support for the gas-permeable membrane 2152 and reducing adverse impact caused by provision of the first channel 2113 on the end cover 211. The valve plate 2151 and gas-permeable membrane 2152 of the breather valve are provided in the breather valve mounting groove 2112, so that on the premise of not affecting gas permeation of the breather valve, the breather valve is mounted without occupying the thickness of the end cover 211 to the greatest extent, helping to reduce an overall height of the end cover assembly 21 and the battery.

The valve plate 2151 is manufactured from, for example, an aluminum plate. The gas-permeable membrane 2152 can be fixed to the valve plate 2151 in various manners. For example, the gas-permeable membrane 2152 can be fixed to the valve plate 2151 by virtue of a chemical bond. The valve plate 2151 can be mounted on the end cover 211 in various mounting manners, for example, being fixedly connected to the end cover 211 by laser welding.

As shown in FIG. 6, FIG. 7, FIG. 14, FIG. 15, FIG. 20, and FIG. 26, in an end cover assembly 21 according to some embodiments, the breather valve further includes a valve plate 2151. The valve plate 2151 is mounted on the end cover 211 and includes a third channel 2151A running through two side surfaces of the valve plate 2151. The gas-permeable membrane 2152 is fixed to the valve plate 2151 and covers the third channel 2151A. As shown in FIG. 6 to FIG. 10, FIG. 14 to FIG. 18, FIG. 20, FIG. 22, FIG. 26, and FIG. 28, the breather valve mounting groove 2112 is a stepped groove, and the stepped groove includes a first groove section 2112A and a second groove section 2112B. The first groove section 2112A is close to the bottom wall of the breather valve mounting groove 2112. The gas-permeable membrane 2152 is located in the first groove section 2112A and has a gap with the bottom wall. The second groove section 2112B is connected to the first groove section 2112A, with a step surface 2112C formed at a joint. The valve plate 2151 is located in the second groove section 2112B and abuts against the step surface 2112C.

The above arrangement helps the gas-permeable membrane 2152 to keep fluid communication with the first channel 2113 and the third channel 2151A and helps the gas-permeable membrane 2152 to stably balance the internal and external pressure of the battery cell.

In an end cover assembly 21 according to some embodiments, a height H1 of the first groove section 2112A is 0.1 mm to 0.5 mm greater than a thickness of the gas-permeable membrane 2152; and/or a height H2 of the second groove section 2112B is equal to a thickness of the valve plate 2151 or is no more than 0.5 mm greater than the thickness of the valve plate 2151.

A reasonable relationship between the height H1 of the first groove section 2112A and the thickness of the gas-permeable membrane 2152 helps to maintain unblocking between the gas-permeable membrane 2152 and the first channel 2113. A reasonable relationship between the height H2 of the second groove section 2112B and the thickness of the valve plate 2151 helps to reduce an additional space other than the thickness of the end plate 211 occupied by the breather valve 215 and also helps to reduce adverse impact on the end plate 211 caused by processing the breather valve mounting groove 2112.

As shown in FIG. 6 to FIG. 10, FIG. 14 to FIG. 18, FIG. 20, FIG. 22, FIG. 26, and FIG. 28, in an end cover assembly 21 according to some embodiments, the end cover 211 includes an end cover body 2111, and the breather valve mounting groove 2112 is provided in the end cover body 2111, where the end cover 211 further includes a lug boss 2114 provided on the end cover body 2111 and protruding towards the second side of the end cover 211, the second channel including a communication groove 2115 or communication hole provided in the lug boss 2114; and/or a ventilation groove 2116, where the ventilation groove 2116 is provided in the end cover body 2111, located on the second side of the end cover 211 and in communication with the breather valve mounting groove 2112, and the second channel includes the ventilation groove 2116.

The lug boss 2114 is provided, and the communication groove 2115 or communication hole is provided in the lug boss 2114 as at least a portion of the second channel, or the ventilation groove 2116 is provided as at least a portion of the second channel, facilitating formation of the second channel by virtue of a simple structure and processing method and preventing the gas permeation function of the gas-permeable membrane 2152 from being affected by the protective patch 217.

The lug boss 2114 may be provided with one or more communication grooves, and an extension direction and a cross section shape of the communication groove are not limited. For example, the cross section may be circular, square, triangular, polygonal, or the like. The lug boss 2114 may alternatively be provided with one or more communication holes, and an extension direction and a cross section shape of the communication hole are not limited. For example, the cross section may be circular, square, triangular, polygonal, or the like. The lug boss 2114 may alternatively be provided with both a communication groove and a communication hole. The position of the communication groove or communication hole can be reasonably arranged according to an environment surrounding the protective patch 217. The number and size of the communication groove or communication hole can be reasonably set according to a flow area required by the second channel.

In an end cover assembly 21 according to some embodiments, the lug boss 2114 has a height H3 of 0.1 mm to 0.5 mm; and/or the lug boss 2114 is located on an outer side of the breather valve mounting groove 2112, and a distance L1 from an edge of the lug boss 2114 close to the breather valve mounting groove 2112 to an edge of the breather valve mounting groove 2112 is 0.5 mm to 3 mm.

A reasonable height H3 of the lug boss 2114 helps to maintain smooth flowing of gas flow inside and outside the battery cell through the breather valve 215 while reducing the height occupied by the breather valve 215 to the greatest extent. Reasonable relative positions of the lug boss 2114 and the breather valve mounting groove 2112 facilitate assembly and convenient operation during maintenance of the breather valve. For example, an operation space is left for laser welding during mounting of the valve plate.

In an end cover assembly 21 according to some embodiments, the ventilation groove 2116 has a depth H4 of 0.05 mm to 0.3 mm; and/or a distance L2 from an edge of the ventilation groove 2116 located on an outer side of the protective patch 217 to an edge of the protective patch 217 is 0.1 mm to 0.5 mm.

A reasonable depth of the ventilation groove 2116 and a reasonable distance from the ventilation groove to the protective patch 217 help to maintain smooth flowing of the gas flow inside and outside the battery cell through the breather valve 215.

As shown in FIG. 11, FIG. 12, FIG. 23, and FIG. 24, in an end cover assembly 21 according to some embodiments, the protective patch 217 includes a patch body 2171 covering the gas-permeable portion 2152A and a fixing adhesive layer 2172, where the fixing adhesive layer 2172 is provided on a side of the patch body 2171 facing the end cover 211, and the patch body 2171 is adhered to the second side of the end cover 211 by virtue of the fixing adhesive layer 2172.

The protective patch 217 is provided with the patch body 2171 and the fixing adhesive layer 2172, and the patch body 2171 is fixedly connected by virtue of the fixing adhesive layer 2172, facilitating quick and secure mounting of the protective patch 217.

In an end cover assembly 21 according to some embodiments, the fixing adhesive layer 2172 is attached to a partial region of the patch body 2171, where a region, with no fixing adhesive layer 2172 attached, of the patch body 2171 is transparent; and/or the region, with the fixing adhesive layer 2172 attached, of the patch body 2171 and/or the fixing adhesive layer 2172 is colored.

The region, with no fixing adhesive layer 2172 attached, of the patch body 2171 is transparent, helping to observe whether there is a foreign substance on surface of the second side of the breather valve 215 facing the end cover assembly 21, thereby discovering problems of the breather valve 215 in a timely manner. The region, with the fixing adhesive layer 2172 attached, of the patch body 2171 and/or the fixing adhesive layer 2172 is colored, for example, may be red, green, blue, or yellow, helping to quickly identify whether the protective patch 217 is provided on the end cover assembly 21, thereby preventing the gas-permeable membrane 217 from being unprotected due to absence of the patch.

As shown in FIG. 11, FIG. 12, FIG. 23, and FIG. 24, in an end cover assembly 21 according to some embodiments, the fixing adhesive layer 2172 is located at an edge of the patch body 2171; and/or the fixing adhesive layer 2172 is kept away from the second channel.

The fixing adhesive layer 2172 is located at the edge of the patch body 2171, such that the amount of a fixing adhesive used can be reduced without affecting an adhesion effect. The fixing adhesive layer 2172 being kept away from the second channel helps to prevent dust adhesion and accumulation at a position where the second channel is located, thereby helping to maintain the second channel unblocked.

In an end cover assembly 21 according to some embodiments, the protective patch 217 includes a patch body 2171 covering the gas-permeable portion 2152A; the patch body 2171 is made of polyethylene glycol terephthalate (polyethylene glycol terephthalate, PET); and/or the patch body 2171 has a thickness of 0.1 mm to 0.2 mm.

The patch body 2171 is made of polyethylene glycol terephthalate and/or the patch body 2171 is provided with an appropriate thickness, such that foreign substances such as electrolyte, moisture, and dust can be effectively shielded.

Figure 29:
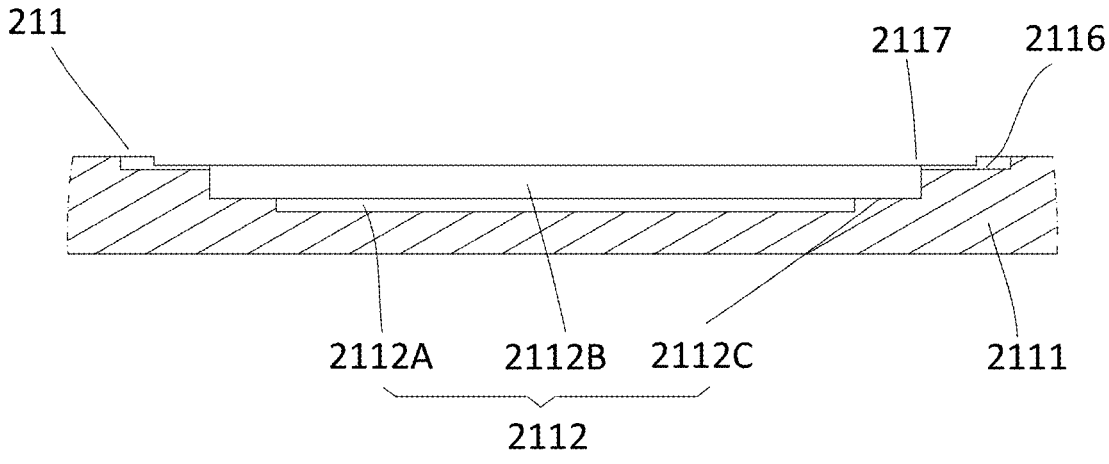
FIG. 29 is a partial schematic structural diagram of an end cover of an end cover assembly of a battery cell according to an embodiment of this disclosure.

As shown in FIG. 29, in an end cover assembly 21 according to some embodiments, the end cover 211 includes a patch mounting groove 2117, and the protective patch 217 is located in the patch mounting groove 2117.

The protective patch 217 is mounted in the patch mounting groove 2117 on the end cover 211, facilitating accurate positioning and quick assembly of the protective patch 217 and helping to prevent the protective patch 217 from falling off.

The battery according to the embodiments of this disclosure includes the end cover assembly 21 according to the embodiments of this disclosure. The battery of this disclosure has the same advantages as the end cover assembly 21 of this disclosure.

The electric device according to the embodiments of this disclosure includes the battery according to the embodiments of this disclosure, where the battery is configured to provide electric power for the electric device. The electric device of this disclosure has the same advantages as the end cover assembly 21 and battery of this disclosure.

The following describes in detail the end cover assembly according to some embodiments of this disclosure with reference to FIG. 5 to FIG. 29. The battery according to the embodiments of this disclosure includes the end cover assembly according to the embodiments of this disclosure. The electric device according to the embodiments of this disclosure includes the battery according to the embodiments of this disclosure. The battery and the electric device are not described in detail below again.

In the embodiment as shown in FIG. 5 to FIG. 12, the end cover assembly 21 includes an end cover 211, a first electrode terminal 212, a second electrode terminal 213, an explosion-proof valve 214, a breather valve 215, and an insulating plate 216. The first electrode terminal 212, the second electrode terminal 213, the explosion-proof valve 214, the breather valve 215, and the insulating plate 216 are all mounted on the end cover 211.

The end cover 211 has a first side (corresponding to a lower side of FIG. 6) facing inside of the battery and a second side (corresponding to an upper side of FIG. 6) opposite the first side and includes a first channel 2113 in communication with the first side and the second side. The first channel 2113 is a through hole formed in the end cover body 2111 of the end cover 211.

The breather valve 215 includes a breather valve body, and the breather valve body includes a valve plate 2151 mounted on the end cover body 2111 and a gas-permeable membrane 2152 mounted on the valve plate 2151 and in gas communication with the first channel 2113.

The valve plate 2151 is manufactured from an aluminum plate, on which a third channel 2151A is provided. The third channel 2151A is a through hole that connects two sides of the valve plate 2151. The shape, number, and size of the through hole can be set according to ventilation requirements. The valve plate 2151 is fixed to the end cover body 2111 by laser welding.

The gas-permeable membrane is bonded to a side of the valve plate 2151 by virtue of a chemical bond, and the gas-permeable membrane 2152 covers the third channel 2151A of the valve plate 2151, so as to ensure that gas flow flowing through the third channel 2151A totally passes through the gas-permeable membrane 2152.

Figure 7:
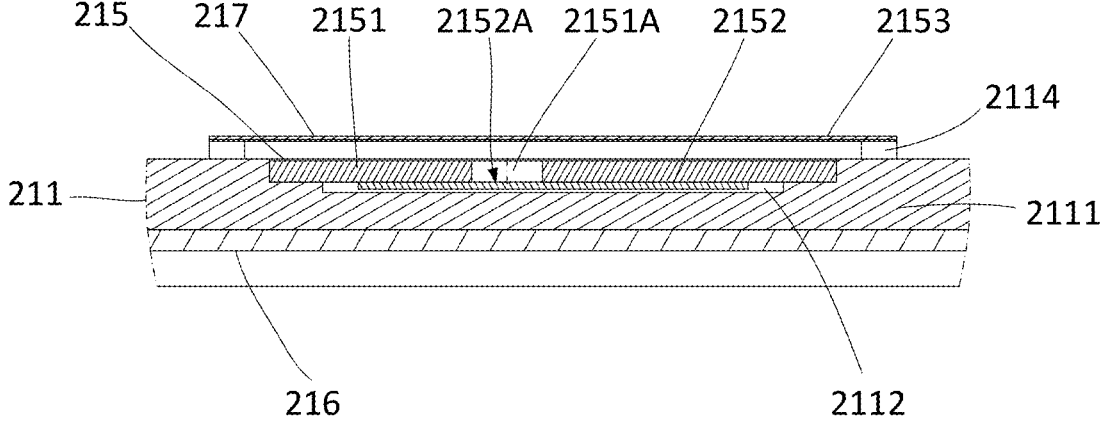
FIG. 7 is a schematic diagram of an enlarged structure of part B in FIG. 6.

As shown in FIG. 7, in this embodiment, the gas-permeable membrane 2152 is located on the first side (corresponding to a lower side of FIG. 7) of the valve plate 2151. However, a region, covering the third channel 2151A, of the gas-permeable membrane 2152 is opened towards the second side (corresponding to an upper side of FIG. 7) of the end cover 211, thereby forming the gas-permeable portion 2152A.

Figure 5:
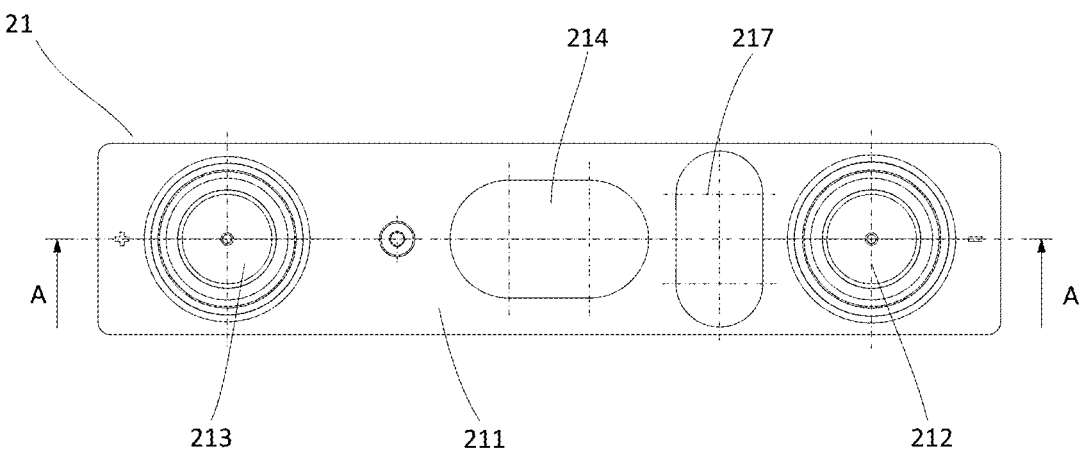
FIG. 5 is a schematic structural diagram of an end cover assembly of a battery cell according to an embodiment of this disclosure.
Figure 6:
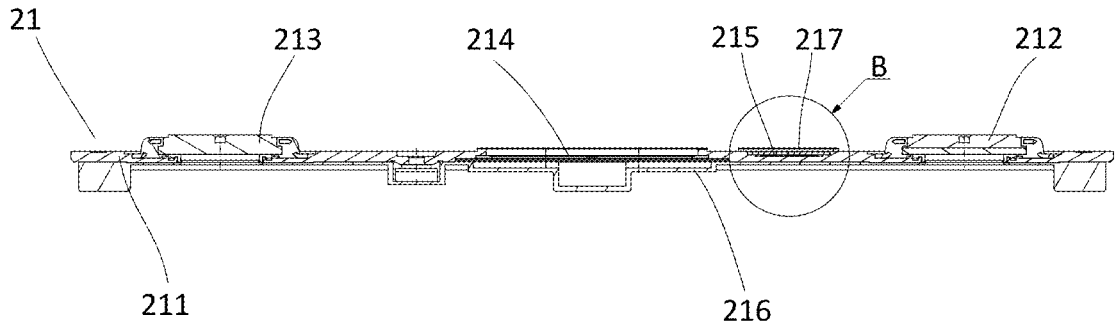
FIG. 6 is a schematic structural cross-sectional view of FIG. 5 along direction A-A.

As shown in FIG. 5 to FIG. 7, the protective patch 217 is fixed to the second side of the end cover 211. The protective patch 217 includes a patch body 2171. The patch body 2171 covers the gas-permeable portion 2152A, opened towards the second side of the end cover 211, of the gas-permeable membrane 2152. The patch body 2171 is made of PET and has a thickness of 0.2 mm.

To prevent influence of provision of the protective patch 217 on normal operation of the breather valve 215, a second channel in gas communication with the gas-permeable membrane 2152 is provided between the patch body 2171 and the end cover 211.

As shown in FIG. 6 to FIG. 10, the end cover 211 includes an end cover body 2111 and a lug boss 2114 that is provided on the end cover body 2111 and protrudes towards the second side of the end cover 211. A breather valve mounting groove 2112 is provided in the end cover body 2111. The breather valve body of the breather valve 215 is mounted in the breather valve mounting groove 2112. The first channel 2113 is provided in the bottom wall of the breather valve mounting groove 2112. The second channel provided between the protective patch 217 and the end cover 211 is in communication with the breather valve mounting groove 2112 so as to ensure that the breather valve 215 balances the internal and external pressure of the battery cell 20. An opening of the breather valve mounting groove 2112 is provided in the first side of the end cover 211.

As shown in FIG. 6 to FIG. 10, the breather valve mounting groove 2112 is a stepped groove, and the stepped groove includes a first groove section 2112A and a second groove section 2112B. The first groove section 2112A is close to the bottom wall of the breather valve mounting groove 2112. The gas-permeable membrane 2152 is located in the first groove section 2112A and has a gap with the bottom wall to ensure that gas flow into or out of the battery cell 20 via the first channel 2113 smoothly passes through the gas-permeable membrane 2152. The second groove section 2112B is connected to the first groove section 2112A, with a step surface 2112C formed at a joint. The valve plate 2151 is located in the second groove section 2112B and abuts against the step surface 2112C. The valve plate 2151 is fixedly connected to the step surface 2112C by laser welding.

In order to maintain smooth flowing of gas between the gas-permeable membrane 2152 and the first channel 2113, the height H1 of the first groove section 2112A is 0.3 mm greater than the thickness of the gas-permeable membrane 2152. In order to maintain smooth flowing of gas between the gas-permeable membrane 2152 and the second channel, the height H2 of the second groove section 2112B is 0.1 mm greater than the thickness of the valve plate 2151.

The lug boss 2114 is located on an outer side of the breather valve mounting groove 2112. Two sides of the lug boss 2114 opposite each other in a length direction (corresponding to a left-right direction in FIG. 5 to FIG. 10) of the end cover 211 each are provided with a communication groove 2115 with a rectangular cross section. The height of each communication groove 2115 is equal to that of the lug boss 2114. The two communication grooves 2115 serve as the second channel to ensure smooth flowing of gas flow into or out of the breather valve 215. The lug boss 2114 has a height H3 OF 0.3 MM. A distance L1 from an edge of the lug boss 2114 close to the breather valve mounting groove 2112 to an edge of the breather valve mounting groove 2112 is 2 mm.

Figure 11:
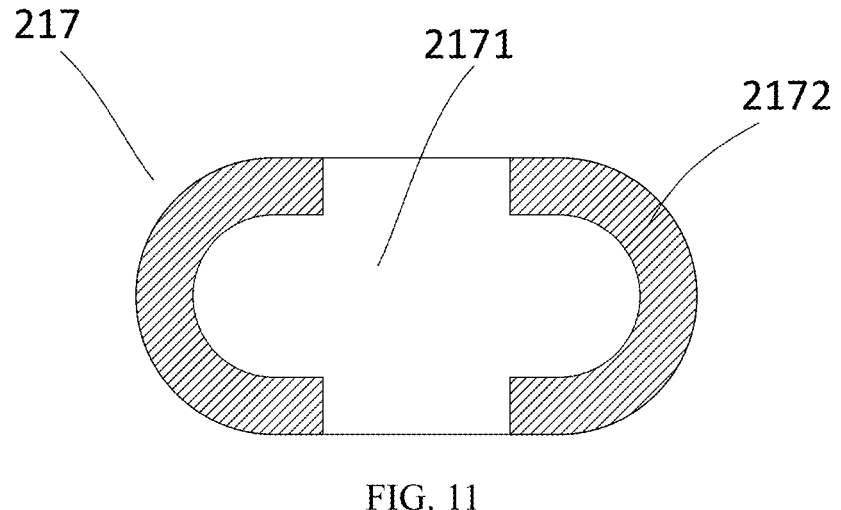
FIG. 11 is a schematic structural diagram of a protective patch of a breather valve in the end cover assembly in FIG. 5 in one direction.
Figure 12:
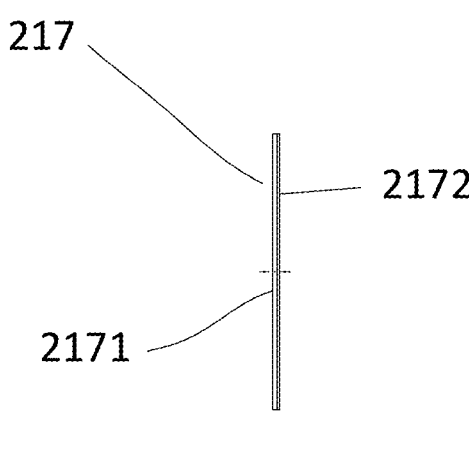
FIG. 12 is a schematic structural diagram of the protective patch shown in FIG. 11 in another direction.
Figure 13:
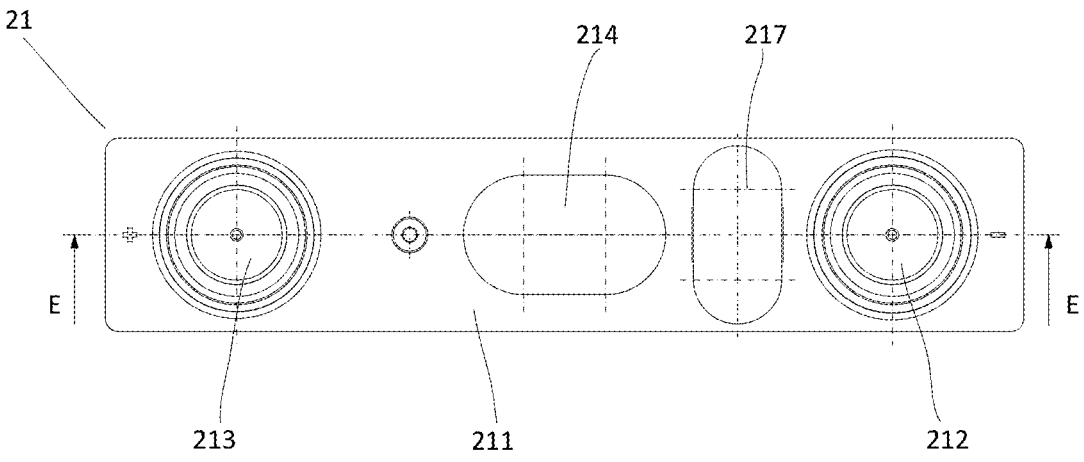
FIG. 13 is a schematic structural diagram of an end cover assembly of a battery cell according to an embodiment of this disclosure.
Figure 14:
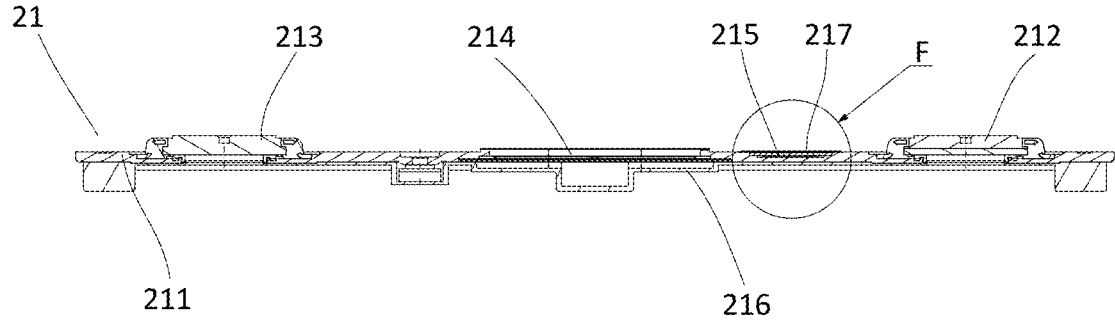
FIG. 14 is a schematic structural cross-sectional view of FIG. 13 along direction E-E.
Figure 15:
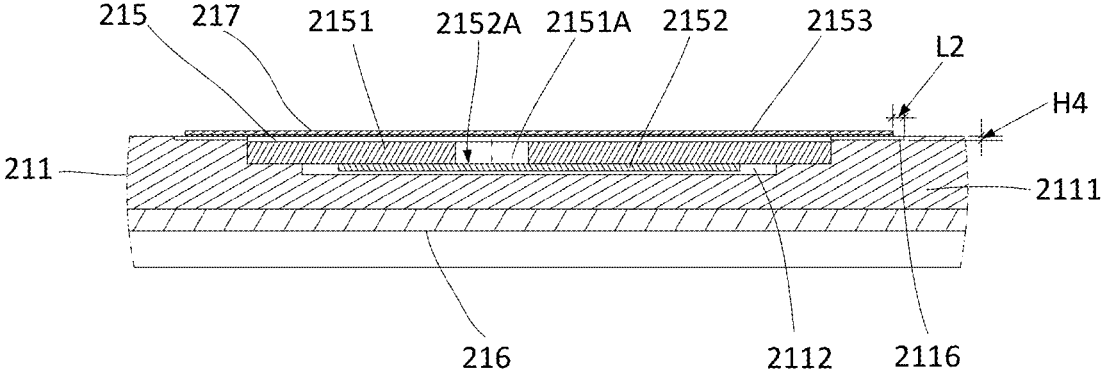
FIG. 15 is a schematic diagram of an enlarged structure of part F in FIG. 14.
Figure 16:
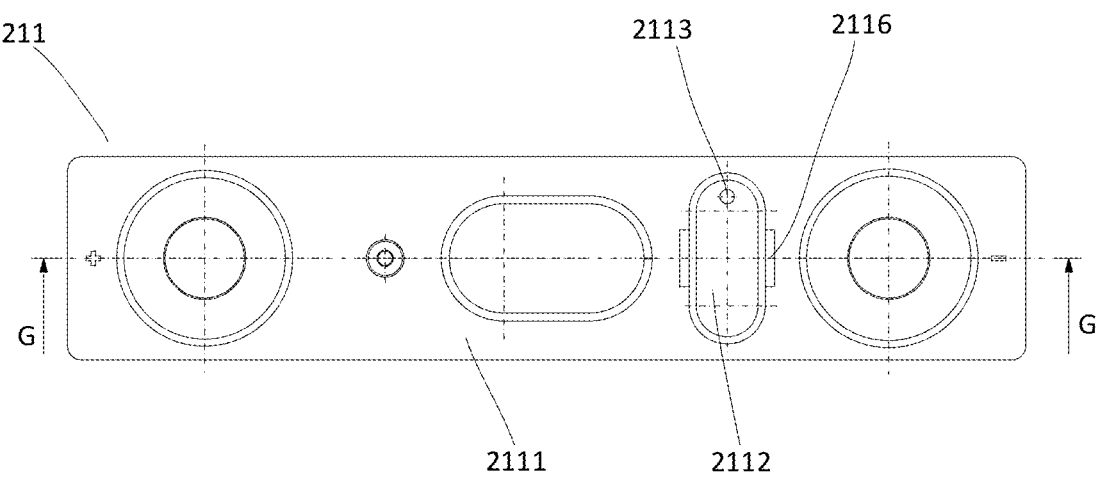
FIG. 16 is a schematic structural diagram of an end cover of the end cover assembly according to the embodiment shown in FIG. 13.
Figure 17:
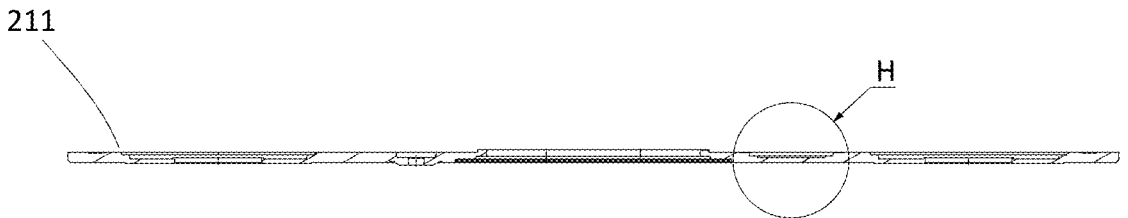
FIG. 17 is a schematic structural cross-sectional view of FIG. 16 along direction G-G.
Figure 18:
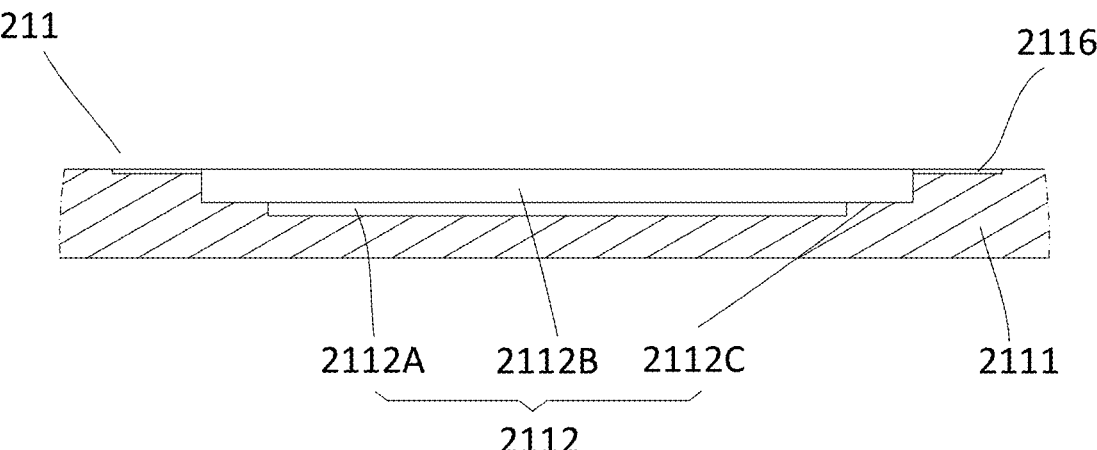
FIG. 18 is a schematic diagram of an enlarged structure of part H in FIG. 17.
Figure 19:
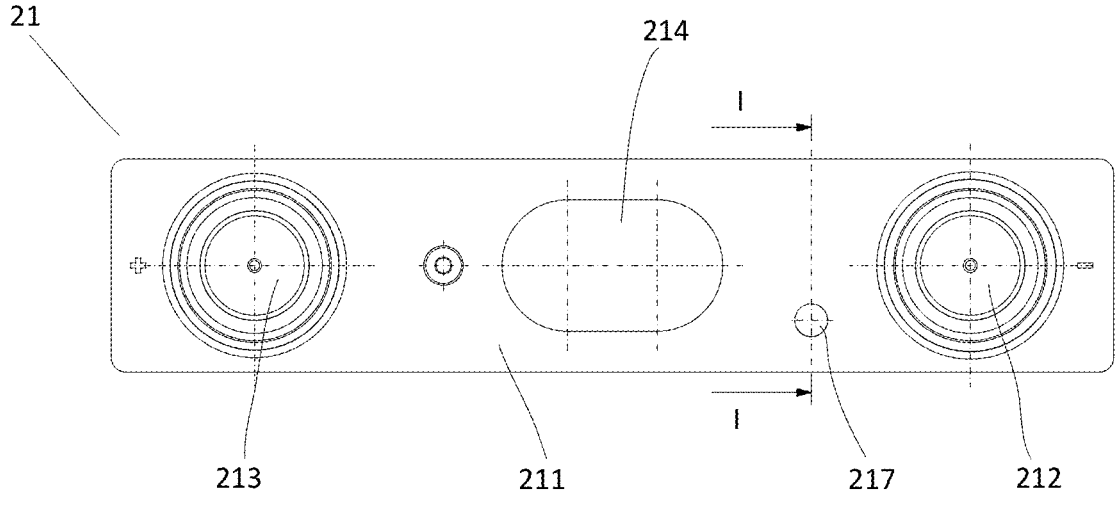
FIG. 19 is a schematic structural diagram of an end cover assembly of a battery cell according to an embodiment of this disclosure.
Figure 20:
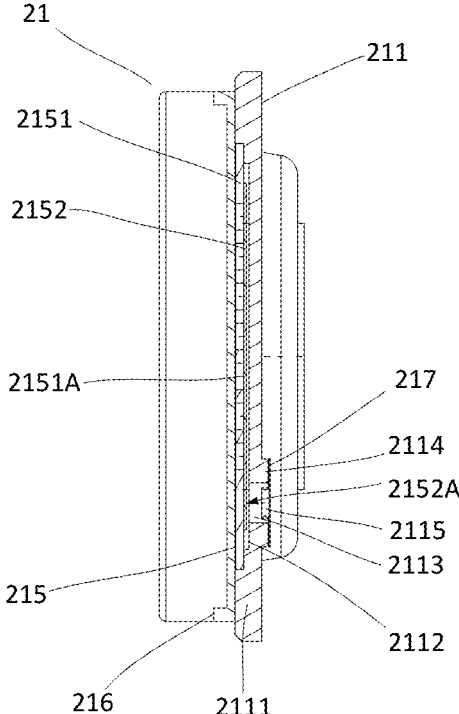
FIG. 20 is a schematic structural cross-sectional view of FIG. 19 along direction I-I.
Figure 21:
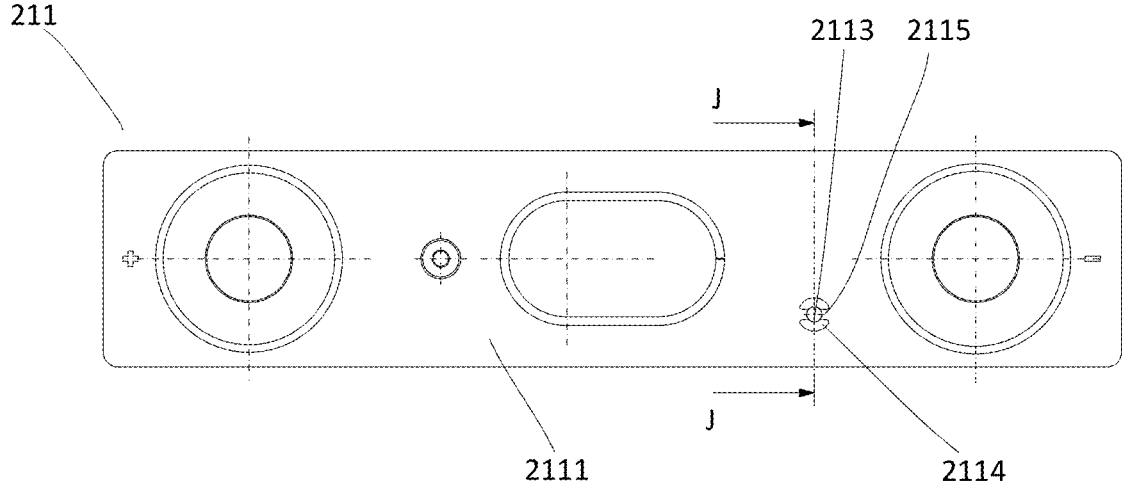
FIG. 21 is a schematic structural diagram of an end cover of the end cover assembly according to the embodiment shown in FIG. 19.
Figure 22:
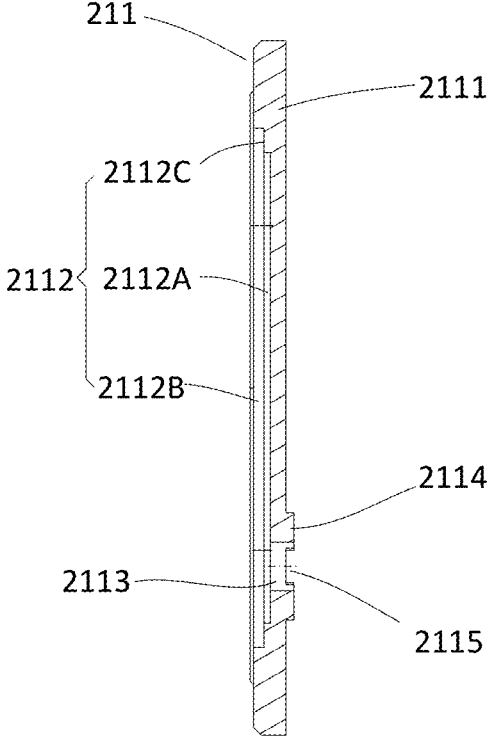
FIG. 22 is a schematic structural cross-sectional view of FIG. 21 along direction J-J.

As shown in FIG. 11 and FIG. 12, the protective patch 217 further includes a fixing adhesive layer 2172, where the fixing adhesive layer 2172 is provided on a side of the patch body 2171 facing the end cover 211, and the patch body 2171 is adhered to the second side of the end cover 211 by virtue of the fixing adhesive layer 2172. The fixing adhesive layer 2172 is attached to a partial region of the patch body 2171. A region, with no fixing adhesive layer 2172 attached, of the patch body 2171 is transparent. The fixing adhesive layer 2172 is green.

Figure 8:
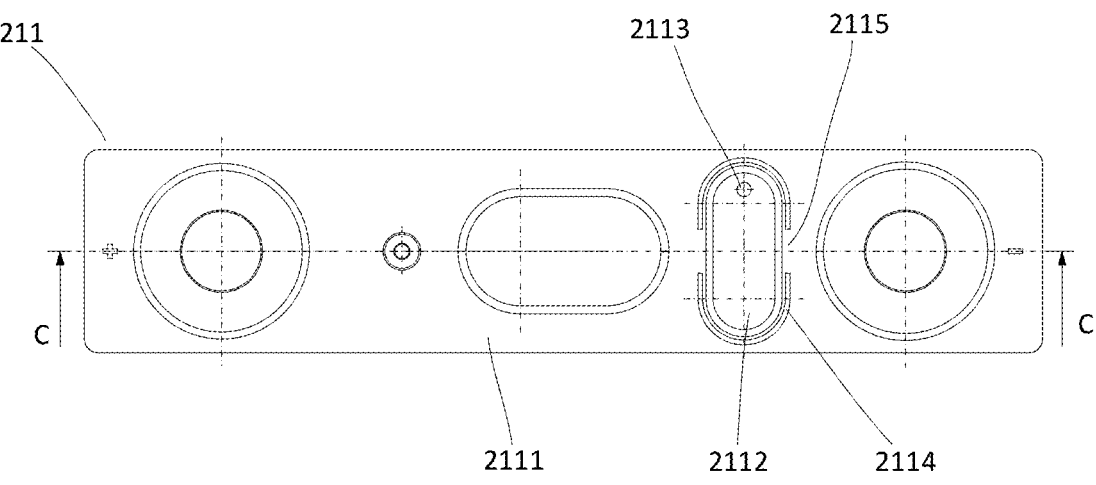
FIG. 8 is a schematic structural diagram of an end cover of the end cover assembly according to the embodiment shown in FIG. 5.
Figure 9:
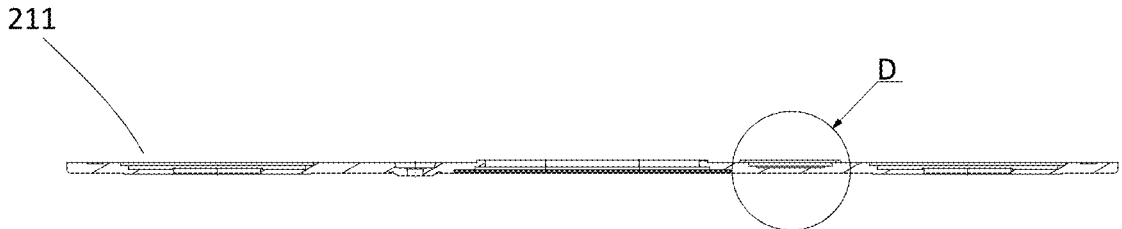
FIG. 9 is a schematic structural cross-sectional view of FIG. 8 along direction C-C.
Figure 10:
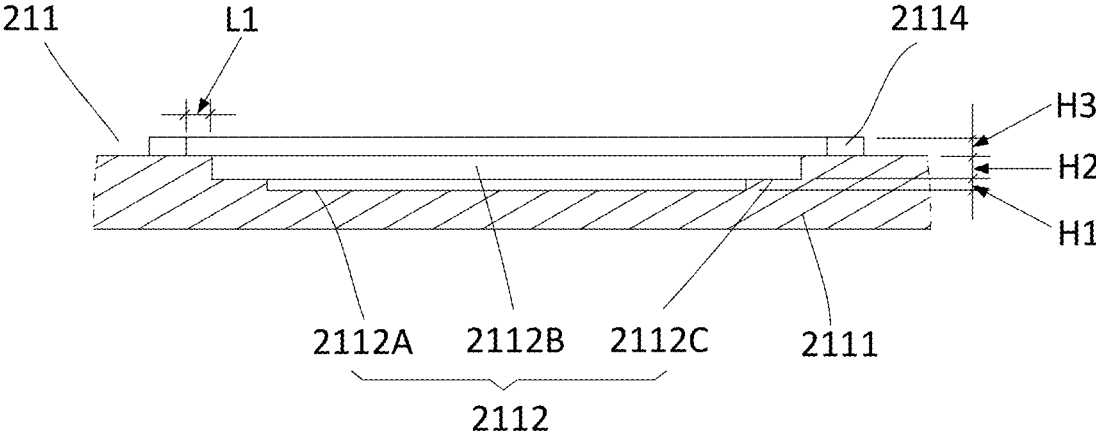
FIG. 10 is a schematic diagram of an enlarged structure of part D in FIG. 9.

As shown in FIG. 11 and FIG. 12, in this embodiment, the fixing adhesive layer 2172 is located at an edge of the patch body 2171 and corresponds to a position of the lug boss 2114 with no communication groove 2115, such that the fixing adhesive layer 2172 is kept away from the second channel. The valve plate 2151 of the breather valve 215, the gas-permeable membrane 2152, and the protective patch 217 are all in a long circular shape extending along a width direction (corresponding to an up-down direction of FIG. 5) of the end cover 211. As shown in FIG. 8, portions of the lug boss 2114 provided with no communication groove 2115 form a pair of U-shaped structures with opposite openings, spaced apart on the end cover. Correspondingly, the fixing adhesive layer 2172 also forms a pair of U-shaped structures with opposite openings, spaced apart at an edge of the patch body 2171. The protective patch 217 covers the lug boss 2114, and the fixing adhesive layer 2172 and the lug boss 2114 face and are attached to each other, such that the protective patch 217 is fixed to the second side of the end cover 211.

The embodiment shown in FIG. 13 to FIG. 18 differs from the embodiment shown in FIG. 5 to FIG. 12 in that a mounting manner of the protective patch 217 is different from an arrangement manner of the second channel.

As shown in FIG. 13 to FIG. 18, a position, where the protective patch 217 is disposed, of the second side of the end cover body 2111 of the end cover 211 is provided with no lug boss, and the protective patch 217 is directly attached to the surface of the second side of the end cover body 2111. The second channel includes the ventilation groove 2116 provided in the second side of the end cover body 2111 and in communication with the breather valve mounting groove 2112. In order to maintain smooth gas flow in the breather valve 215, the ventilation groove 2116 has a depth H4 of 0.2 mm; a distance L2 from an edge of the ventilation groove 2116 located on an outer side of the protective patch 217 to an edge of the protective patch 217 is 0.4 mm; and the height H2 of the second groove section 2112B is 0.3 mm greater than the thickness of the valve plate 2151.

The ventilation grooves 2116 are two rectangular grooves facing each other. In the unillustrated embodiments, the ventilation groove may be of another shape with an arc-shaped cross section, a trapezoidal cross section, a triangular cross section, or the like, or may be provided in another number, for example, one, three, or more than four. The size, shape, and number of the ventilation groove can be reasonably set according to a flow area of the second channel. A position for arranging the ventilation groove can be reasonably set according to an environment surrounding the protective patch.

The foregoing describes the differences between the embodiment shown in FIG. 13 to FIG. 18 and the embodiment shown in FIG. 5 to FIG. 12. For any other parts not illustrated in these embodiments, reference can be made to the related content in the embodiment shown in FIG. 5 to FIG. 12. This is not repeated herein.

The embodiment shown in FIG. 19 to FIG. 24 differs from the embodiment shown in FIG. 5 to FIG. 12 in that the breather valve mounting groove 2112 is disposed in a different position.

As shown in FIG. 19 to FIG. 22, in this embodiment, an opening of the breather valve mounting groove 2112 faces the first side of the end cover 211. The gas-permeable portion 2152A, opened towards the second side of the end cover 211, of the gas-permeable membrane 2152 is located in a perforated region of the third channel 2113. On the second side of the end cover 211, the lug boss 2114 is disposed around an end opening of the third channel 2113 on the second side of the end cover 211, and two communication grooves 2116 are provided in the lug boss 2114 as the second channel.

Figure 23:
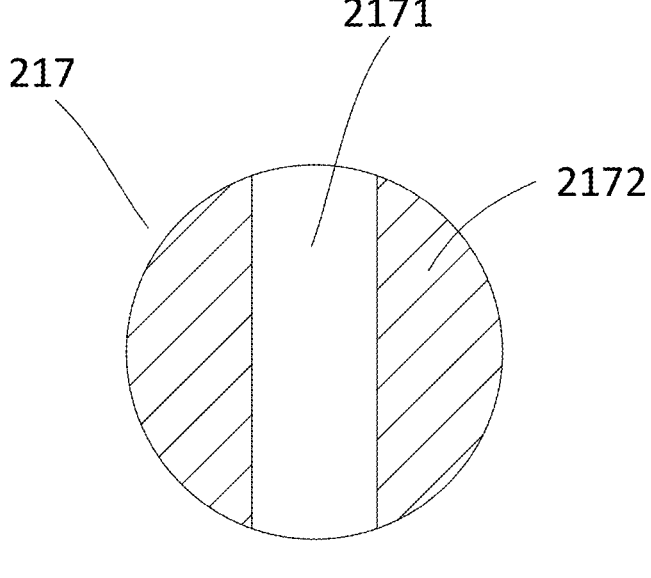
FIG. 23 is a schematic structural diagram of a protective patch of a breather valve in the end cover assembly in FIG. 19 in one direction.
Figure 24:
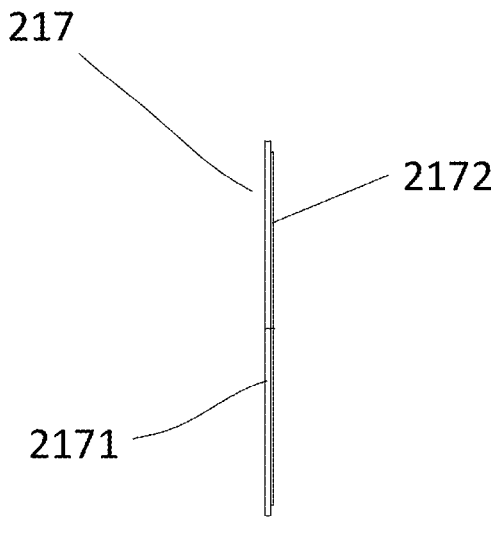
FIG. 24 is a schematic structural diagram of the protective patch shown in FIG. 23 in another direction.
Figure 25:
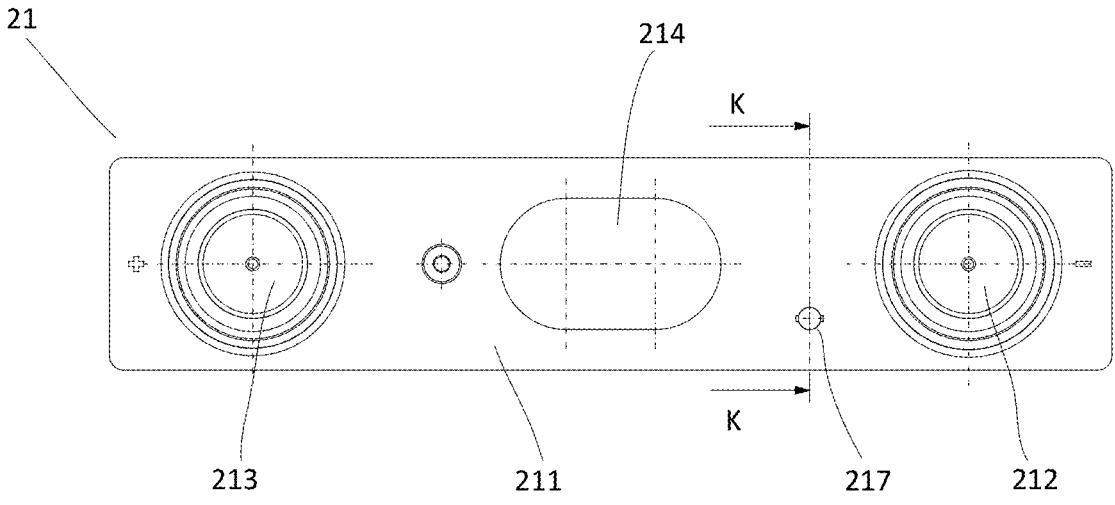
FIG. 25 is a schematic structural diagram of an end cover assembly of a battery cell according to an embodiment of this disclosure.
Figure 26:
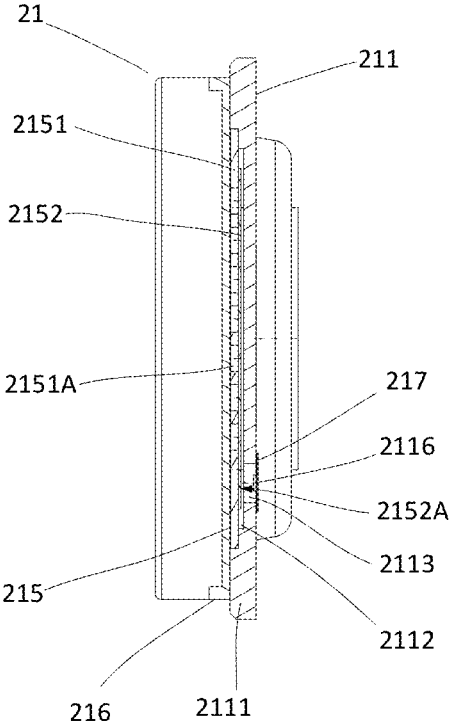
FIG. 26 is a schematic structural cross-sectional view of FIG. 25 along direction K-K.
Figure 27:
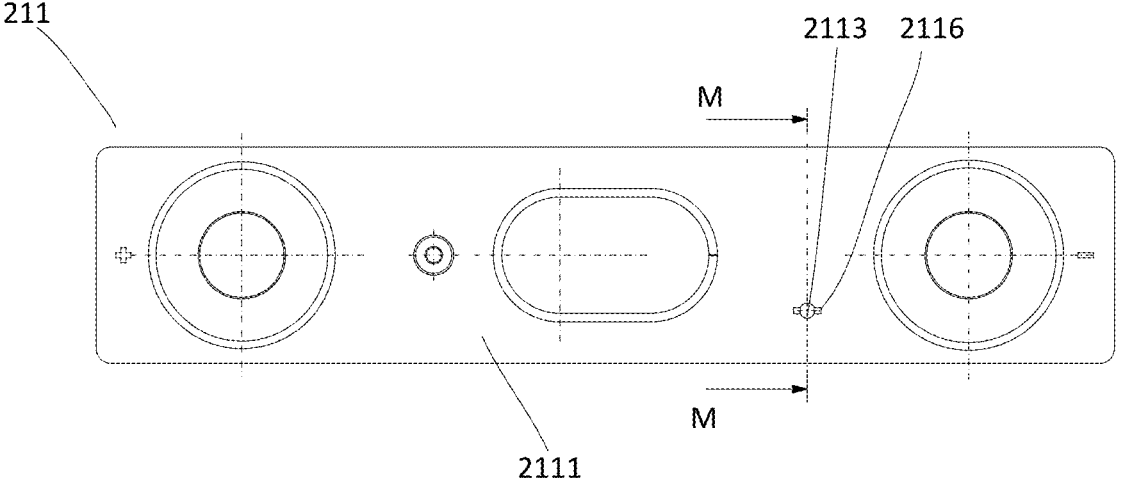
FIG. 27 is a schematic structural diagram of an end cover of the end cover assembly according to the embodiment shown in FIG. 25.
Figure 28:
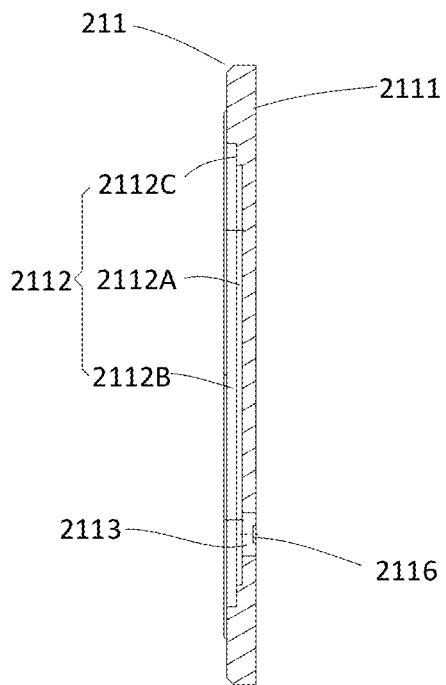
FIG. 28 is a schematic structural cross-sectional view of FIG. 27 along direction M-M.

As shown in FIG. 23 and FIG. 24, the fixing adhesive layer 2172 is located at an edge of the patch body 2171 and corresponds to a position of the lug boss 2114 with no communication groove 2115, such that the fixing adhesive layer 2172 is kept away from the second channel. The valve plate 2151 of the breather valve 215 and the gas-permeable membrane 2152 are both in a long circular shape extending along a width direction (corresponding to an up-down direction of FIG. 5) of the end cover 211. The third channel 2113 is a round hole provided in the end cover body 2111. The lug boss 2114 is disposed around an end opening of the third channel 2113, and portions with no communication groove 2115 are two spaced arc shapes facing each other. The protective patch 217 is circular. Corresponding to the lug boss 2114, the fixing adhesive layer 2172 also forms a pair of arc shapes that have opposite openings and that are spaced apart at the edge of the patch body 2171. The protective patch 217 covers the lug boss 2114, and the fixing adhesive layer 2172 and the lug boss 2114 face and are attached to each other, such that the protective patch 217 is fixed to the second side of the end cover 211.

The foregoing describes the differences between the embodiment shown in FIG. 19 to FIG. 24 and the embodiment shown in FIG. 5 to FIG. 12. For any other parts not illustrated in these embodiments, reference can be made to the related content in the embodiment shown in FIG. 5 to FIG. 12. This is not repeated herein.

The embodiment shown in FIG. 25 to FIG. 28 differs from the embodiment shown in FIG. 19 to FIG. 24 in that a position, where the protective patch 217 is disposed, of the second side of the end cover body 2111 of the end cover 211 is provided with no lug boss, and the protective patch 217 is directly attached to the surface of the second side of the end cover body 2111. The second channel includes the ventilation groove 2116 provided in the second side of the end cover body 2111 and in communication with the breather valve mounting groove 2112. In order to maintain smooth gas flow in the breather valve 215, the ventilation groove 2116 has a depth H4 of 0.3 mm; and the distance L2 from the edge of the ventilation groove 2116 located on the outer side of the protective patch 217 to the edge of the protective patch 217 is 0.5 mm. The height H2 of the second groove section 2112B is 0.1 mm greater than the thickness of the valve plate 2151.

In this embodiment, the ventilation grooves 2116 are two rectangular grooves facing each other. In the unillustrated embodiments, the ventilation groove may be of another shape with an arc-shaped cross section, a trapezoidal cross section, a triangular cross section, or the like, or may be provided in another number, for example, one, three, or more than four. The size, shape, and number of the ventilation groove can be reasonably set according to a flow area of the second channel. A position for arranging the ventilation groove can be reasonably set according to an environment surrounding the protective patch.

The foregoing describes the differences between the embodiment shown in FIG. 25 to FIG. 28 and the embodiment shown in FIG. 19 to FIG. 24. For any other parts not illustrated in these embodiments, reference can be made to the related content in the embodiment shown in FIG. 5 to FIG. 12 and FIG. 19 to FIG. 24. This is not repeated herein.

The embodiment shown in FIG. 29 differs from the embodiment shown in FIG. 13 to FIG. 18 in that the end cover body 2111 is further provided with a patch mounting groove 2117, and the protective patch 217 is located in the patch mounting groove 2117. The protective patch 217 is mounted in the patch mounting groove 2117 on the end cover 211, facilitating accurate positioning and quick assembly of the protective patch 217 and helping to prevent the protective patch 217 from falling off.

The foregoing describes the differences between the embodiment shown in FIG. 29 and the embodiment shown in FIG. 13 to FIG. 18. For any other parts not illustrated in these embodiments, reference can be made to the related content in the embodiment shown in FIG. 5 to FIG. 12 and FIG. 13 to FIG. 18. This is not repeated herein.

Although this disclosure has been described with reference to some preferred embodiments, various modifications to this disclosure and replacements of the components therein with equivalents can be made without departing from the scope of this application. In particular, as long as there is no structural conflict, the various technical features mentioned in the embodiments can be combined in any manner. This disclosure is not limited to the specific embodiments disclosed in this specification, but includes all technical solutions falling within the scope of the claims.

What is claimed is:

1. An end cover assembly, applied to a battery and comprising:

an end cover, having a first side facing inside of the battery and a second side opposite the first side and comprising a first channel in communication with the first side and the second side;

a breather valve, comprising a gas-permeable membrane in gas communication with the first channel, wherein the gas-permeable membrane comprises a gas-permeable portion opened towards the second side of the end cover; and a protective patch, provided on the second side of the end cover and covering the gas-permeable portion, wherein a second channel in gas communication with the gas-permeable membrane is provided between the protective patch and the end cover;

wherein the end cover comprises a breather valve mounting groove; the breather valve is located in the breather valve mounting groove; the first channel is provided in a bottom wall of the breather valve mounting groove; and the second channel is in communication with the breather valve mounting groove;

wherein an opening of the breather valve mounting groove is provided in the first side of the end cover, or the opening of the breather valve mounting groove is provided in the second side of the end cover.

2. The end cover assembly according to claim 1, wherein the breather valve further comprises a valve plate; the valve plate is mounted on the end cover and comprises a third channel running through two side surfaces of the valve plate; and the gas-permeable membrane is fixed to the valve plate and covers the third channel; wherein the breather valve mounting groove is a stepped groove, the stepped groove comprising:

a first groove section close to the bottom wall of the breather valve mounting groove, wherein the gas-permeable membrane is located in the first groove section and has a gap with the bottom wall; and a second groove section connected to the first groove section, with a step surface formed at a joint, wherein the valve plate is located in the second groove section and abuts against the step surface.

3. The end cover assembly according to claim 2, wherein a height of the first groove section is 0.1 mm to 0.5 mm greater than a thickness of the gas-permeable membrane; and/or a height of the second groove section is equal to a thickness of the valve plate or is no more than 0.5 mm greater than the thickness of the valve plate.

4. The end cover assembly according to claim 1, wherein the end cover comprises an end cover body, the breather valve mounting groove being disposed on the end cover body; wherein the end cover further comprises:

a lug boss provided on the end cover body and protruding towards the second side of the end cover, wherein the second channel comprises a communication groove or communication hole provided in the lug boss; and/or a ventilation groove, wherein the ventilation groove is provided in the end cover body, located on the second side of the end cover and in communication with the breather valve mounting groove; and the second channel comprises the ventilation groove.

5. The end cover assembly according to claim 4, wherein the lug boss has a height of 0.1 mm to 0.5 mm; and/or the lug boss is located on an outer side of the breather valve mounting groove, and a distance from an edge of the lug boss close to the breather valve mounting groove to an edge of the breather valve mounting groove is 0.5 mm to 3 mm.

6. The end cover assembly according to claim 4, wherein the ventilation groove has a depth of 0.05 mm to 0.3 mm; and/or a distance from an edge of the ventilation groove located on an outer side of the protective patch to an edge of the protective patch is 0.1 mm to 0.5 mm.

7. The end cover assembly according to claim 1, wherein the protective patch comprises a patch body covering the gas-permeable portion and a fixing adhesive layer, wherein the fixing adhesive layer is provided on a side of the patch body facing the end cover, and the patch body is adhered to the second side of the end cover by virtue of the fixing adhesive layer.

8. The end cover assembly according to claim 7, wherein the fixing adhesive layer is attached to a partial region of the patch body, wherein a region, with no fixing adhesive layer attached, of the patch body is transparent; and/or the region, with the fixing adhesive layer attached, of the patch body and/or the fixing adhesive layer is colored.

9. The end cover assembly according to claim 7, wherein the fixing adhesive layer is located at an edge of the patch body; and/or the fixing adhesive layer is kept away from the second channel.

10. The end cover assembly according to claim 1, wherein the protective patch comprises a patch body covering the gas-permeable portion, wherein the patch body is made of polyethylene glycol terephthalate; and/or the patch body has a thickness of 0.1 mm to 0.2 mm.

11. The end cover assembly according to claim 1, wherein the end cover comprises a patch mounting groove, and the protective patch is located in the patch mounting groove.

12. A battery, wherein the battery comprises the end cover assembly according to claim 1.

13. An electric device, wherein the electric device comprises the battery according to claim 12, and the battery is configured to provide electric power for the electric device.

* * * * *